(12) United States Patent
Yanagi

(10) Patent No.: US 10,784,012 B2
(45) Date of Patent: Sep. 22, 2020

(54) METHOD OF PRODUCING SULFIDE SOLID ELECTROLYTE MATERIAL

(71) Applicant: TOYOTA JIDOSHA KABUSHIKI KAISHA, Toyota-shi, Aichi-ken (JP)

(72) Inventor: Takuo Yanagi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 93 days.

(21) Appl. No.: 15/849,897

(22) Filed: Dec. 21, 2017

(65) Prior Publication Data

US 2018/0183096 A1    Jun. 28, 2018

(30) Foreign Application Priority Data

Dec. 27, 2016 (JP) ................. 2016-252755

(51) Int. Cl.
| | |
|---|---|
| H01B 1/10 | (2006.01) |
| H01M 10/052 | (2010.01) |
| H01M 10/0562 | (2010.01) |
| C01B 17/22 | (2006.01) |
| C01B 17/28 | (2006.01) |
| C01D 15/00 | (2006.01) |

(52) U.S. Cl.
CPC .............. *H01B 1/10* (2013.01); *C01B 17/22* (2013.01); *C01D 15/00* (2013.01); *H01M 10/052* (2013.01); *H01M 10/0562* (2013.01); *C01P 2002/50* (2013.01); *C01P 2002/72* (2013.01); *C01P 2004/03* (2013.01); *H01M 2300/008* (2013.01)

(58) Field of Classification Search
CPC ......... H01B 1/06; H01B 1/10; H01M 10/052; H01M 10/0525; H01M 10/0562; H01M 2300/0065; H01M 2300/0068; H01M 2300/008; C01D 15/00; C01D 15/04; C01D 15/06; C01B 17/22; C01B 17/24; C01B 17/28; C01B 17/36; C01B 17/38; C01B 17/40; C03C 4/14; C01P 2002/50; C01P 2002/72; C01P 2004/03
See application file for complete search history.

(56) References Cited

U.S. PATENT DOCUMENTS

2014/0272554 A1* 9/2014 Yanagi .............. H01M 10/0562
                                                            429/189
2014/0315098 A1* 10/2014 Inoue .................. C01F 7/70
                                                            429/304
(Continued)

FOREIGN PATENT DOCUMENTS

| CN | 103597546 A | 2/2014 |
|---|---|---|
| EP | 2 919 313 A1 | 9/2015 |

(Continued)

*Primary Examiner* — Matthew R Diaz
(74) *Attorney, Agent, or Firm* — Oliff PLC

(57) ABSTRACT

The present disclosure provides a method of producing a sulfide solid electrolyte material which includes a preparing process of preparing composite particles including a solid solution including a $Li_2S$ component and a LiBr component; an addition process of adding the composite particles and a phosphorus source to a reaction chamber; and a milling process in which a mechanical milling treatment is performed on the composite particles and the phosphorus source in the reaction chamber while thermal energy is applied.

17 Claims, 5 Drawing Sheets

(56) References Cited

U.S. PATENT DOCUMENTS

| | | | |
|---|---|---|---|
| 2015/0214574 A1* | 7/2015 | Tanaka | H01B 1/10 |
| | | | 429/323 |
| 2015/0318569 A1* | 11/2015 | Yanagi | H01M 10/0562 |
| | | | 252/62.2 |
| 2016/0260963 A1 | 9/2016 | Suzuki | |
| 2017/0008808 A1 | 1/2017 | Yanagi | |
| 2018/0138545 A1 | 5/2018 | Aburatani et al. | |

FOREIGN PATENT DOCUMENTS

| | | |
|---|---|---|
| JP | H07-316087 A | 12/1995 |
| JP | 2014-179265 A | 9/2014 |
| JP | 5904291 B2 | 4/2016 |
| JP | 2016-162733 A | 9/2016 |
| JP | 2016-207355 A | 12/2016 |
| JP | 2017-018872 A | 1/2017 |
| WO | 2012/176266 A1 | 12/2012 |
| WO | 2016/167302 A1 | 10/2016 |

* cited by examiner

COMPARATIVE EXAMPLE 2
COMPOSITE PARTICLES

COMPARATIVE EXAMPLE
$Li_2S$

COMPARATIVE EXAMPLE
LiBr

COMPARATIVE EXAMPLE
LiI

COMPARATIVE EXAMPLE
$P_2S_5$

COMPARATIVE EXAMPLE 1

COMPARATIVE EXAMPLE

METHOD OF PRODUCING SULFIDE SOLID ELECTROLYTE MATERIAL

INCORPORATION BY REFERENCE

The disclosure of Japanese Patent Application No. 2016-252755 filed on Dec. 27, 2016 including the specification, drawings and abstract is incorporated herein by reference in its entirety.

BACKGROUND

1. Technical Field

The present disclosure relates to a method of producing a sulfide solid electrolyte material through which it is possible to reduce a milling time.

2. Description of Related Art

Lithium batteries have a higher energy density than other batteries and can be operated at a high voltage. Thus, they are used for information devices such as mobile phones as batteries that are easily reduced in size and weight. In recent years, demand for large-scale power such as for electric vehicles and hybrid vehicles has increased.

Since an electrolyte solution including a flammable organic solvent is used for currently commercially available lithium batteries, a safety system for preventing a temperature rise is necessary. On the other hand, when a flame retardant solid electrolyte material is used in place of an electrolyte solution, it is easy to simplify the safety system. As such a solid electrolyte material, a sulfide solid electrolyte material is known.

As a technology for a sulfide solid electrolyte material, for example, the following technology is known. For example, in Japanese Unexamined Patent Application Publication No. 2016-162733 (JP 2016-162733 A), a method of producing an electrode body in which a mixture including $Li_2S$, LiI, LiBr, and $P_2S_5$ is subjected to a mechanical milling treatment to prepare an amorphous sulfide solid electrolyte material which is then heated at a predetermined temperature together with an oxide active material is disclosed.

In addition, in Japanese Unexamined Patent Application Publication No. 2014-179265 (JP 2014-179265 A), a method of producing a sulfide solid electrolyte material in which a mechanical milling treatment is performed on a mixture of $Li_2S$ and LiX (X is F, Cl, Br, or I) obtained by a specific method and $P_2S_5$ is disclosed. In addition, in Japanese Patent No. 5904291 (JP 5904291 B), a method of producing a sulfide solid electrolyte material in which raw materials including $Li_2S$, $P_2S_5$, and LiI in specific proportions is subjected to a mechanical milling treatment when thermal energy is applied is disclosed.

SUMMARY

JP 2016-162733 A, JP 2014-179265 A, and JP 5904291 B disclose that a mechanical milling treatment is performed on $Li_2S$, $P_2S_5$ and LiX (X=halogen), and a sulfide solid electrolyte material (sulfide glass) is synthesized. On the other hand, the inventors have found that there is a problem of a milling time increasing due to low reactivity of LiBr.

In response to such a problem, the inventors have confirmed that composite particles including a solid solution including a $Li_2S$ component and a LiBr component may be prepared and thus the reactivity of the LiBr component can be improved. However, there is a new problem that, in opposition to improvement in reactivity of the LiBr component, the reactivity of the $Li_2S$ component decreases, and as a result, it is not possible to sufficiently reduce a milling time.

The present disclosure provides a method of producing a sulfide solid electrolyte material through which it is possible to reduce a milling time.

An aspect of the present disclosure relates to a method of producing a sulfide solid electrolyte material which includes a preparing process of preparing composite particles including a solid solution including a $Li_2S$ component and a LiBr component; an addition process of adding the composite particles and a phosphorus source to a reaction chamber; and a milling process in which a mechanical milling treatment is performed on the composite particles and the phosphorus source in the reaction chamber while thermal energy is applied.

According to the present disclosure, when composite particles including a solid solution including a $Li_2S$ component and a LiBr component are used and a mechanical milling treatment is performed when thermal energy is applied, it is possible to improve the reactivity of the LiBr component and it is possible to prevent the reactivity of the $Li_2S$ component from decreasing, and as a result, it is possible to reduce a milling time (a reaction time for electrolyte synthesis).

In the above disclosure, the solid solution may include at least one of a $Li_2S$ rich phase in which the $Li_2S$ component is a main component and a LiBr rich phase in which the LiBr component is a main component.

In the above disclosure, in XRD measurement using CuKα rays, a peak position of the (111) plane of the $Li_2S$ rich phase may be shifted to a lower angle side of a peak position of the (111) plane of $Li_2S$.

In the above disclosure, in XRD measurement using CuKα rays, a peak position of the (111) plane of the LiBr rich phase may be shifted to a lower angle side of a peak position of the (111) plane of LiBr.

In the above disclosure, the solid solution may further include a LiI component.

In the above disclosure, the solid solution may include a LiI rich phase in which the LiI component is a main component.

In the above disclosure, in XRD measurement using CuKα rays, a peak position of the (111) plane of the LiI rich phase may be shifted to a higher angle side of a peak position of the (111) plane of LiI.

In the above disclosure, in the preparing process, the composite particles may be synthesized using a raw material solution including raw materials of the composite particles.

In the above disclosure, in the preparing process, a raw material solution including raw materials of the composite particles and a good solvent may be brought into contact with a poor solvent heated to a temperature higher than a boiling point of the good solvent so that the composite particles are precipitated while the good solvent is evaporated.

In the above disclosure, in the preparing process, a raw material solution including raw materials of the composite particles and a good solvent may be brought into contact with a solid heated to a temperature higher than a boiling point of the good solvent so that the composite particles are precipitated while the good solvent is evaporated.

In the above disclosure, the raw materials of the composite particles may include LiHS and LiBr.

In the above disclosure, the raw materials of the composite particles may include $Li_2S$ and LiBr.

In the above disclosure, the raw materials of the composite particles may further include LiI.

In the above disclosure, the preparing process may include a drying treatment in which a raw material solution including LiOH, LiBr, and water is dried to remove moisture such that a raw material mixture including LiOH such that LiBr is obtained; a sulfurization treatment in which LiOH in the raw material mixture is sulfurized such that LiHS is obtained; and a hydrodesulfurization treatment in which hydrogen sulfide is desorbed from LiHS and $Li_2S$ is obtained.

In the above disclosure, the raw material solution may further include LiI.

In the above disclosure, the phosphorus source may be $P_2S_5$.

In the above disclosure, a heating temperature in the milling process may be in a range of 70° C. to 150° C.

According to the method of producing a sulfide solid electrolyte material of the present disclosure, it is possible to reduce the milling time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A method of producing a sulfide solid electrolyte material of the present disclosure will be described below in detail.

Figure 1:
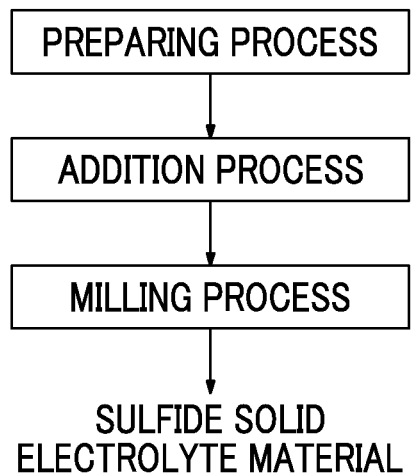
FIG. 1 is a flowchart showing an example of a method of producing a sulfide solid electrolyte material of the present disclosure.

FIG. 1 is a flowchart showing an example of a method of producing a sulfide solid electrolyte material of the present disclosure. As shown in FIG. 1, in the method of producing a sulfide solid electrolyte material of the present disclosure, first, composite particles including a solid solution including a $Li_2S$ component and a LiBr component is prepared (preparing process). Here, the solid solution may further include a LiI component. Next, the obtained composite particles and a phosphorus source (for example, $P_2S_5$) are added to a reaction chamber (for example, a pot of a planetary ball mill) (addition process). Next, a mechanical milling treatment is performed on the composite particles and the phosphorus source in the reaction chamber when thermal energy is applied (milling process). Thus, a sulfide solid electrolyte material is obtained.

Figure 2:
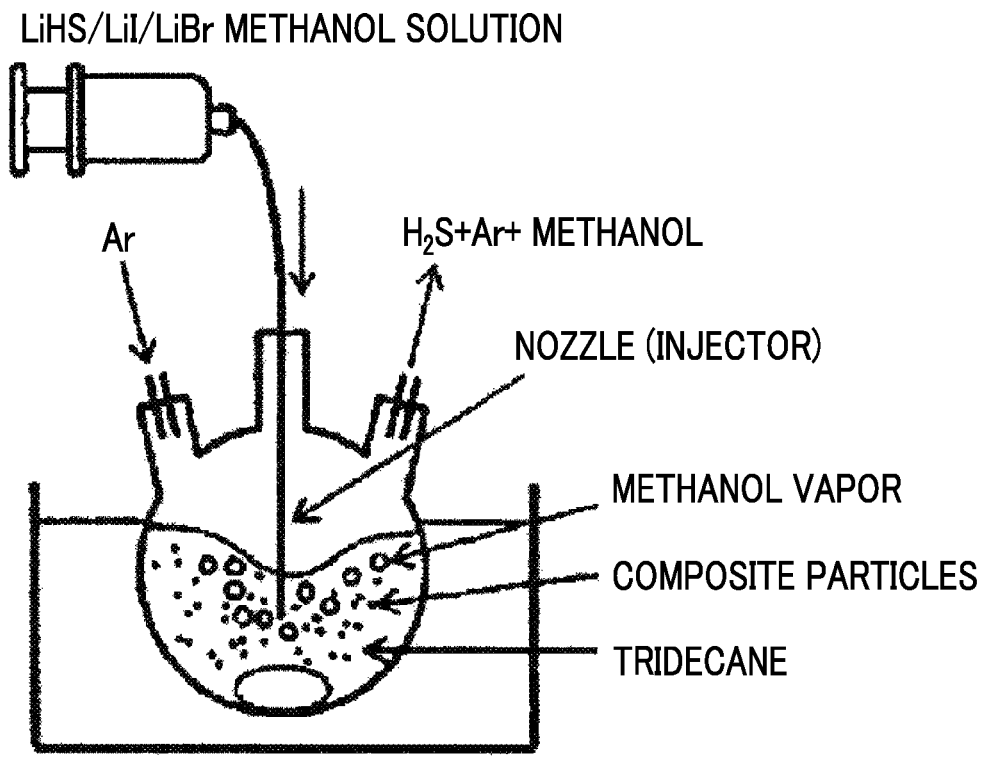
FIG. 2 is a schematic diagram showing an example of a preparing process in the present disclosure.

FIG. 2 is a schematic diagram showing an example of a preparing process in the present disclosure. In FIG. 2, a raw material (LiHS, LiI, and LiBr) of composite particles is dissolved in methanol as a good solvent to prepare a raw material solution. Here, LiHS is lithium hydrogen sulfide. Next, tridecane as a poor solvent is added to a 3-neck flask, and tridecane is heated at a temperature higher than a boiling point of methanol. In addition, Ar gas is circulated in the 3-neck flask. Next, a raw material solution is sprayed into the heated poor solvent through a nozzle. Thus, methanol as a good solvent evaporates instantaneously. At the same time, $Li_2S$ is produced from LiHS (2LiHS→$Li_2S$+$H_2S$), and $H_2S$ is discharged from the 3-neck flask together with Ar gas. In this manner, in the poor solvent, composite particles including a solid solution including a $Li_2S$ component, a LiI component, and a LiBr component are precipitated. When the above addition process and milling process are performed using such composite particles, it is possible to obtain a sulfide solid electrolyte material. The poor solvent may be a solvent that satisfies the following conditions (i) and (ii).

(i) A boiling point of the poor solvent is higher than that of a good solvent, and (ii) the solubilities of the raw materials (LiHS, LiI, and LiBr) of composite particles in a poor solvent are lower than the solubility in the good solvent of (i).

According to the present disclosure, when composite particles including a solid solution including a $Li_2S$ component and a LiBr component are used and a mechanical milling treatment is performed when thermal energy is applied, it is possible to improve the reactivity of the LiBr component and it is possible to prevent the reactivity of the $Li_2S$ component from decreasing, and as a result, it is possible to reduce a milling time (a reaction time for electrolyte synthesis).

As described above, the inventors confirmed that, when composite particles including a solid solution including a $Li_2S$ component and a LiBr component are prepared, it is possible to improve the reactivity of the LiBr component. However, there is a new problem that, in opposition to improvement in reactivity of the LiBr component, the reactivity of the $Li_2S$ component decreases, and as a result, it is not possible to sufficiently reduce a milling time. In response to this new problem, when composite particles are used and a mechanical milling treatment is performed when thermal energy is applied, it is possible to improve the reactivity of the LiBr component and prevent the reactivity of the $Li_2S$ component from decreasing. Here, in the present disclosure, the starting point is that the reactivity of $Li_2S$ and the reactivity of LiBr are greatly different, and problems specific to a sulfide solid electrolyte material including $Li_2S$ and LiBr are addressed. Processes of the method of producing a sulfide solid electrolyte material of the present disclosure will be described below.

1. Preparing Process

The preparing process in the present disclosure is a process of preparing composite particles including a solid solution including a $Li_2S$ component and a LiBr component. In the preparing process, composite particles may be prepared by synthesis or composite particles synthesized in advance may be prepared.

Composite particles include a solid solution including a $Li_2S$ component and a LiBr component. Preferably, the solid solution further includes a LiI component. In addition, in the solid solution, components are solid-solutionized, and are clearly different from a mixture in which, for example, $Li_2S$ powder, LiBr powder, and LiI powder are simply mixed. The fact that composite particles include the solid solution can be confirmed by, for example, measurement through TEM-EDX (transmission electron microscope-energy dispersive X-ray spectroscopy) or measurement through XRD (X-ray diffraction). In addition, the expressions "$Li_2S$ component," "LiBr component," and "LiI component" do not specify raw materials ($Li_2S$ powder, LiBr powder, and LiI powder) of a solid solution. As will be described below, for example, when desulfurization hydrogenation of LiHS is performed, the $Li_2S$ component is formed. In this manner, the expressions "$Li_2S$ component," "LiBr component," and "LiI component" merely define components of a solid solution.

In addition, preferably, the solid solution includes at least one of a $Li_2S$ rich phase in which a $Li_2S$ component is a main component and a LiBr rich phase in which a LiBr component is a main component. Further, the solid solution preferably includes a LiI rich phase in which a LiI component is a main component.

The $Li_2S$ rich phase is a phase in which a $Li_2S$ component is a main component. The $Li_2S$ rich phase is preferably a phase in which a LiBr component is solid-solutionized in a $Li_2S$ phase and may be a phase in which a LiI component is solid-solutionized. In addition, when a LiBr component or the like is solid-solutionized in the $Li_2S$ phase, a peak position of the $Li_2S$ phase in XRD measurement changes. In the present disclosure, in XRD measurement using CuKα rays, a peak position of the (111) plane of the $Li_2S$ rich phase may be shifted to a lower angle side of a peak position of the (111) plane of $Li_2S$. A shift amount is, for example, 0.05° or more, and may be 0.1° or more.

The LiBr rich phase is a phase in which a LiBr component is a main component. The LiBr rich phase is preferably a phase in which a $Li_2S$ component is solid-solutionized in a LiBr phase and may be a phase in which a LiI component is solid-solutionized. In addition, when a $Li_2S$ component or the like is solid-solutionized in a LiBr phase, a peak position of the LiBr phase in XRD measurement changes. In the present disclosure, in XRD measurement using CuKα rays, a peak position of the (111) plane of the LiBr rich phase may be shifted to a lower angle side of a peak position of the (111) plane of LiBr. A shift amount is, for example, 0.05° or more, and may be 0.1° or more or 0.3° or more.

The LiI rich phase is a phase in which a LiI component is a main component. The LiI rich phase is preferably a phase in which at least one of a $Li_2S$ component and a LiBr component is solid-solutionized in a LiI phase. In addition, when a $Li_2S$ component, a LiBr component, or the like is solid-solutionized in a LiI phase, a peak position of a LiI phase in XRD measurement changes. In the present disclosure, in XRD measurement using CuKα rays, a peak position of the (111) plane of the LiI rich phase may be shifted to a higher angle side of a peak position of the (111) plane of LiI. A shift amount is, for example, 0.05° or more, and may be 0.1° or more, 0.3° or more, or 0.5° or more.

Here, in the $Li_2S$ phase, LiBr phase, and LiI phase, since positions of anions in a crystal structure are generally the same, components are solid-solutionized and rich phases are easily formed. In addition, in order to improve the reactivity of the LiBr component, a peak intensity of the LiBr rich phase in XRD measurement is preferably lower than a peak intensity of the $Li_2S$ phase (or the $Li_2S$ rich phase). Similarly, a peak intensity of the LiBr rich phase is preferably lower than a peak intensity of the LiI phase (or the LiI rich phase). In addition, the solid solution may not have a peak of the LiBr rich phase.

In addition, in the preparing process, preferably, composite particles are synthesized using a raw material solution in which raw materials of the composite particles are included. This is because it is then easy to form a solid solution including, for example, a $Li_2S$ component, a LiBr component, and a LiI component. As raw materials of composite particles, for example, $Li_2S$, LiHS, LiOH, LiBr, LiI, $Br_2$, $I_2$, and S may be exemplified. The raw material solution preferably includes at least one of $Li_2S$, LiHS, and LiOH, and LiBr. In addition, preferably, the raw material solution further includes LiI. Here, preferably, a raw material composition of composite particles is appropriately adjusted so that a composition of a sulfide solid electrolyte material to be described below is obtained. In addition, the raw material solution may or may not include a phosphorus source to be described below, and the latter case is preferable.

As a method of synthesizing composite particles using a raw material solution, for example, a method using a difference in solubility may be exemplified (first synthesis method). As the first synthesis method, for example, a method in which a raw material solution including raw materials of composite particles and a good solvent is brought into contact with a poor solvent so that the composite particles are precipitated may be exemplified.

In the first synthesis method, the raw material solution includes raw materials of composite particles and a good solvent. The raw material solution includes, for example, $Li_2S$ and LiBr, as raw materials of composite particles. On the other hand, the raw material solution may include LiHS and LiBr as raw materials of composite particles. When LiHS is used, an amount of the good solvent (for example, methanol) remaining in the composite particles is reduced more easily than when $Li_2S$ is used. As a method of producing a raw material solution in which LiHS is dissolved, for example, a method in which $H_2S$ gas is blown into a solution in which $Li_2S$ is dissolved may be exemplified ($Li_2S+H_2S \rightarrow 2LiHS$). In addition, the raw material solution may further include LiI.

As the good solvent, a solvent having high solubility in raw materials of composite particles is preferable. For example, methanol, water, and toluene may be exemplified. The total proportion of the raw materials in the raw material solution is, for example, 5 g/L or more, preferably 10 g/L or more, more preferably 20 g/L or more, and most preferably 50 g/L or more. Here, in the raw material solution, a part of raw materials of composite particles may be dissolved in a good solvent, a part thereof may be dispersed in a good solvent, or the entire raw material of composite particles may be dissolved in a good solvent.

As the poor solvent, a solvent having low solubility in composite particles is preferable. For example, dodecane, and tridecane may be exemplified. In addition, when the raw material solution comes into contact with a poor solvent, the poor solvent is preferably heated to a temperature higher than a boiling point of the good solvent (evaporative crystallization). In other words, when the raw material solution is brought into contact with a poor solvent heated to a temperature higher than a boiling point of a good solvent, composite particles are preferably precipitated while the good solvent is evaporated. This is because the good solvent is evaporated at the same time at which the raw material solution is contact to the good solvent and composite particles having a high degree of solid solution formation are precipitated. In addition, when a liquid poor solvent in a heated state is used, there are an advantage of fast heat conduction and an advantage of easy collection.

A heating temperature of the poor solvent is, for example, preferably 165° C. or more, more preferably 170° C. or more, and most preferably 190° C. or more, with respect to a boiling point of the good solvent. This is because it is then easy to obtain composite particles having a particularly high degree of solid solution formation and having a small particle size. On the other hand, a heating temperature of the poor solvent is generally equal to or lower than a boiling point of the poor solvent. In addition, when the raw material solution includes LiHS as raw materials of the composite particles, a $Li_2S$ component is produced from LiHS when the good solvent is evaporated ($2LiHS \rightarrow Li_2S+H_2S$).

A method of bringing a raw material solution into contact with a poor solvent is not particularly limited, but a method of bringing droplets of a raw material solution into contact with a poor solvent is preferable. This is because composite particles having a high degree of solid solution formation are precipitated. As a method of bringing droplets of a raw material solution into contact with a poor solvent, for example, a method of spraying a raw material solution into a poor solvent may be exemplified. In this case, the raw material solution may be sprayed from above a poor solvent or the raw material solution may be sprayed into a poor solvent. As a spraying device, for example, an injector, a pressure nozzle, and a two-fluid nozzle may be exemplified.

In addition, as another method of synthesizing composite particles using a raw material solution, for example, a method in which a raw material solution including raw materials of composite particles and a good solvent is brought into contact with a solid heated to a temperature higher than a boiling point of a good solvent, and the composite particles are precipitated while the good solvent is evaporated (second synthesis method) may be exemplified. Here, the second synthesis method is preferably the same as in evaporative crystallization in the first synthesis method except that a heated solid is used in place of a heated poor solvent.

As the heated solid, for example, a plate may be exemplified. For example, preferably, a raw material solution is brought into contact with a heated SUS plate. As a device that performs the second synthesis method, for example, a disk dryer may be exemplified. Since a heating temperature of a solid, a raw material solution contact method, and other details are basically the same as those in the first synthesis method, details thereof will be omitted.

In addition, as another method of synthesizing composite particles using a raw material solution, for example, there is a method (third synthesis method) including a drying treatment in which a raw material solution including LiOH, LiBr, and water is dried to remove moisture such that a raw material mixture including LiOH and LiBr is obtained, a sulfurization treatment in which LiOH in the raw material mixture is sulfurized such that LiHS is obtained, and a hydrodesulfurization treatment in which hydrogen sulfide is desorbed from LiHS such that $Li_2S$ is obtained. The raw material solution may further include LiI.

As the drying treatment, for example, heat drying, reduced pressure drying (vacuum drying), freeze drying, and spray drying may be exemplified. Here, in freeze drying, generally, an object is frozen, the pressure is reduced in a vacuum pump, and a solvent is sublimed and dried. In heat drying, a heating temperature is, for example, in a range of 50° C. to 200° C., and preferably in a range of 100° C. to 150° C.

As the sulfurization treatment, for example, there is a method in which a sulfurizing gas is reacted with LiOH in a raw material mixture. As the sulfurizing gas, for example, $H_2S$, $CS_2$, and elemental sulfur vapor may be exemplified. Among these, $H_2S$ or $CS_2$ is preferable. A temperature at which a sulfurizing gas is reacted is, for example, in a range of 0° C. to 200° C., and preferably in a range of 100° C. to 150° C. Here, a mixture obtained by sulfurizing LiOH into LiHS is dissolved in a good solvent and the first synthesis method or the second synthesis method may be performed.

As the hydrodesulfurization treatment, for example, there is a heat drying treatment. A temperature of the heat drying treatment is, for example, in a range of 150° C. to 220° C., and preferably in a range of 170° C. to 190° C. In addition, the heat drying treatment is preferably performed (i) in the state where a raw material mixture is dissolved or dispersed in a solvent or (ii) in an inert gas atmosphere. In the former case, in particular, an aprotic solvent is preferably used as a solvent, and a nonpolar aprotic solvent is more preferable. Among these, a solvent used for the hydrodesulfurization treatment is preferably an alkane that is liquid at normal temperature (25° C.). On the other hand, as the inert gas atmosphere, for example, an argon gas atmosphere and a nitrogen gas atmosphere may be exemplified. Here, the hydrodesulfurization treatment may be a freeze drying treatment.

In addition, the sulfurization treatment and the hydrodesulfurization treatment may be performed as one reaction. Specifically, when a temperature at which LiOH in the raw material mixture is sulfurized is set to be relatively high, the sulfurization treatment and the hydrodesulfurization treatment can be continuously performed. In addition, the sulfurization treatment and the hydrodesulfurization treatment can be continuously performed while being dissolved or dispersed a solvent. Here, according to the sulfurization treatment and the hydrodesulfurization treatment, a mixture obtained by converting LiOH into $Li_2S$ via LiHS is dissolved in a good solvent, and the first synthesis method or the second synthesis method may be performed.

Here, as a method of synthesizing composite particles using the raw material solution, an evaporation drying method, a spray drying method, and the like can be used. However, in the first synthesis method (particularly, evaporative crystallization) or the second synthesis method, composite particles having a higher degree of solid solution formation are obtained.

2. Addition Process

The addition process in the present disclosure is a process of adding the composite particles and phosphorus source to a reaction chamber.

The phosphorus source is not particularly limited as long as it is a material including the element P. For example, phosphorus sulfide and elemental phosphorus may be exemplified. Phosphorus sulfide is a compound that is generally represented as $P_xS_y$ (x and y are arbitrary real numbers), and is, for example typically, $P_2S_5$.

According to proportions of the composite particles and phosphorus source added to the reaction chamber, a composition of the obtained sulfide solid electrolyte material changes. The sulfide solid electrolyte material preferably has a composition of $a\mathrm{LiI} \cdot b\mathrm{LiBr} \cdot c(d\mathrm{Li}_2\mathrm{S} \cdot (1-d)\mathrm{P}_2\mathrm{S}_5)$ (where, $a+b+c=100$). Here, a may be 0 or may be greater than 0, but b is generally greater than 0. Values of a and b each are independently, for example, 5 or more, and may be 7 or more, or 10 or more. On the other hand, values of a and b each are independently, for example, 30 or less, and may be 20 or less or 15 or less. In addition, a value of c is, for example, 50 or more, and may be 60 or more or 70 or more. On the other hand, a value of c is, for example, 90 or less. In addition, a value of d is, for example, 0.50 or more, and may be 0.70 or more or 0.72 or more. On the other hand, a value of d is, for example, 0.90 or less, and may be 0.88 or less, 0.80 or less, or 0.78 or less. Here, the composition does not specify a raw material. Thus, for example, when a raw material obtained by mixing elemental P and elemental S at the same stoichiometric ratio instead of diphosphorus pentasulfide ($P_2S_5$) is used, this is included in the composition. This similarly applies to components other than $P_2S_5$.

In addition, a mechanical milling treatment to be described below is performed in the reaction chamber. The type of the reaction chamber differs depending on a mechanical milling device. For example, when ball milling is performed, a pot into which composite particles and a phosphorus source are added corresponds to the reaction chamber. In addition, for example, when vibration milling is performed, a grinding chamber into which composite particles and a phosphorus source are added corresponds to the reaction chamber. In addition, in circulation type milling such as bead milling, composite particles, a phosphorus source, and a poor solvent are mixed in advance in a tank to form a slurry, and the slurry may be sent to a grinding chamber by a pump.

A method of adding composite particles and a phosphorus source to a reaction chamber differs depending on a mechanical milling device. For example, a method of adding composite particles and a phosphorus source at the same time, and a method of adding one of composite particles and a phosphorus source first and adding the other thereof later may be exemplified. In the former case, for example, a method of adding a mixture of composite particles and a phosphorus source to a reaction chamber at the same time may be exemplified.

3. Milling Process

The milling process in the present disclosure is a process in which a mechanical milling treatment is performed on the composite particles and the phosphorus source in the reaction chamber while thermal energy is applied. In the milling process, a reaction of synthesizing a sulfide solid electrolyte material (sulfide glass) occurs.

In the present disclosure, the mechanical milling treatment is performed when thermal energy is applied. The description "the mechanical milling treatment is performed when thermal energy is applied," means that the mechanical milling treatment is performed while thermal energy is applied and the mechanical milling treatment is performed on raw materials (at least one of composite particles and a phosphorus source) to which thermal energy is applied in advance and in which thermal energy still remains. Here, the mechanical milling treatment may be performed on the raw materials to which thermal energy is applied in advance while thermal energy is applied.

As a method of applying thermal energy, for example, there is a method of heating a reaction chamber or raw materials. In addition, as the method of heating a reaction chamber or raw materials, for example, there is a method using a heater. The reaction chamber or raw materials may be directly heated by the heater or the reaction chamber or raw materials may be indirectly heated. As an example of the latter method, there is a method in which a mechanical milling device is accommodated in a case including a heater, an atmosphere around the reaction chamber is heated, and thus the reaction chamber is indirectly heated. Here, when the reaction chamber is heated, generally, heating is performed from outside of the reaction chamber. However, heating may be performed from the inside of the reaction chamber, for example, when a heater is installed on an inner surface of the reaction chamber.

The heating temperature is, for example, 70° C. or more, and preferably 120° C. or more. This is because, when the heating temperature is too low, a decrease in the reactivity of the $Li_2S$ component may not be sufficiently suppressed. On the other hand, the heating temperature is, for example, 150° C. or less. This is because, when the heating temperature is too high, a crystal phase with low Li ion conductivity is likely to appear and there is a possibility of Li ion conductivity being lowered. In addition, the heating temperature can be determined from, for example, a set temperature of the heater and a surface temperature of the reaction chamber. The surface temperature of the reaction chamber can be measured using, for example, a temperature sensing label. In particular, heating is preferably performed so that the outer surface temperature of the reaction chamber falls within the above-described range. In addition, when the mechanical milling treatment is performed, the temperature of the raw materials (at least one of composite particles and a phosphorus source) is preferably in the above-described temperature range.

The mechanical milling treatment is not particularly limited as long as it is a process of mixing composite particles and a phosphorus source while mechanical energy is applied. For example, ball milling, vibration milling, bead milling, turbo milling, disk milling, and mechanofusion may be exemplified. Various conditions of the mechanical milling treatment are set so that a desired sulfide solid electrolyte material (sulfide glass) is obtained. For example, when ball milling is used, raw materials and a grinding ball are added to a container, and processing is performed at a predetermined rotational speed and for a predetermined time. A weighing table rotational speed when planetary ball milling is performed is, for example, in a range of 200 rpm to 500 rpm. In addition, the diameter of the grinding balls is, for example, in a range of 1 mm to 20 mm.

The mechanical milling treatment may be a dry mechanical milling treatment or a wet mechanical milling treatment. As a liquid (dispersion medium) used in the wet mechanical milling treatment, an alkane that is liquid at normal temperature (25° C.) may be exemplified. The alkane may be a chain alkane or a cyclic alkane. Examples of the alkane include pentane, hexane, heptane, octane, nonane, decane, undecane, dodecane, paraffin, cyclopentane, cyclohexane, cycloheptane, cyclooctane, and cycloparaffin.

A time of the mechanical milling treatment is not particularly limited, but it is preferably, for example, a time over which an XRD peak of the LiBr phase (or LiBr rich phase) disappears. In particular, a time over which XRD peaks of the $Li_2S$ phase (or $Li_2S$ rich phase) and the LiBr phase (or LiBr rich phase) disappear is preferable. In particular, when composite particles including a solid solution additionally including a LiI component are used, a time over which an XRD peak of the LiI phase (or LiI rich phase) also disappears is preferable. A time of the mechanical milling treatment is, for example, less than 10 hours.

4. Other Processes

In the present disclosure, after the milling process, a heat treatment process may be performed. Sulfide glass can be obtained according to the milling process. However, when a heat treatment is performed thereafter, it is possible to obtain a sulfide glass ceramic. The temperature of the heat treatment is not particularly limited, but it is, for example, in a range of 150° C. to 300° C.

5. Sulfide Solid Electrolyte Material

The sulfide solid electrolyte material obtained in the present disclosure generally includes the element Li, the element P, the element S, and the element Br, and preferably further includes the element I. In addition, the sulfide solid electrolyte material includes an ion conductor including the element Li, the element P, and the element S, and LiBr, and preferably further includes LiI. In addition, LiBr and LiI are preferably dispersed in the ion conductor. The ion conductor preferably has a $PS_4^{3-}$ structure as an anion structure. This is because it is then possible to obtain a sulfide solid electrolyte material having high chemical stability. Further, the proportion of the $PS_4^{3-}$ structure with respect to the entire anion structure of the ion conductor is, for example, 50 mol % or more, and may be 70 mol % or more or 90 mol % or more.

The sulfide solid electrolyte material may be a sulfide glass or a sulfide glass ceramic. It is preferable that the sulfide solid electrolyte material have high Li ion conductivity. The Li ion conductivity of the sulfide solid electrolyte material at 25° C. is preferably, for example, $1 \times 10^{-4}$ S/cm or more. In addition, the sulfide solid electrolyte material has, for example, a particle form. Furthermore, the average particle size ($D_{50}$) of the sulfide solid electrolyte material is, for example, in a range of 0.1 μm to 30 μm.

The sulfide solid electrolyte material is preferably used for, for example, a lithium battery. The lithium battery generally includes a positive electrode active material layer, a negative electrode active material layer, and a solid electrolyte layer formed between the positive electrode active material layer and the negative electrode active material layer. The sulfide solid electrolyte material obtained in the present disclosure is preferably used for at least one layer of the positive electrode active material layer, the negative electrode active material layer, and the solid electrolyte layer. In addition, the lithium battery may be a primary battery or a secondary battery, and is preferably a secondary battery between these. This is because charging and discharging can be repeated and the secondary battery is beneficial, for example, as a vehicle battery. The shape of the lithium battery may include, for example, a coin type, a laminated type, a cylindrical type, and a rectangular type.

Here, the present disclosure is not limited to this embodiment. This embodiment is an example, and any embodiment that has substantially the same configuration and exhibits the same operations and effects as those of the present disclosure is included in the technical scope of the present disclosure.

The present disclosure will be described below in further detail with reference to examples and comparative examples.

Comparative Example 1

$Li_2S$, LiI, LiBr, and $P_2S_5$ were weighed out at a molar ratio of $Li_2S$:LiI:LiBr:$P_2S_5$=6:1:1:2, and mixed in a glove box under an argon atmosphere. The composition of the obtained mixture was $10LiI \cdot 10LiBr \cdot 80(0.75Li_2S \cdot 0.25P_2S_5)$. Next, the obtained mixture was subjected to a mechanical milling treatment according to planetary ball milling and a sulfide solid electrolyte material was obtained. Milling conditions were as follows.

<Milling Conditions>
Composition: $10LiI \cdot 10LiBr \cdot 80(0.75Li_2S \cdot 0.25P_2S_5)$
Pot: 45 cc commercially available from Fritsch Co., Ltd.
Loading amount: 2 g
Dispersion medium: dodecane 4 g
Device: planetary ball mill (P7 commercially available from Fritsch Co., Ltd.)
Rotational speed: 500 rpm

[Evaluation]

Changes in residual amounts of raw materials over time during milling in Comparative Example 1 were evaluated through XRD measurement. CuKα rays were used for measurement, and peak intensities of the (111) plane of $Li_2S$, LiI, and LiBr were measured. Here, peaks of the (111) plane of $Li_2S$, LiI, and LiBr appeared in the vicinity of 2θ=26°, 2θ=27°, and 2θ=28°, respectively. In addition, a residual amount of a raw material of $Li_2S$ was calculated using a total (initial peak intensity sum) of peak intensities of the (111) plane of $Li_2S$, LiI, and LiBr in the mixture before milling as a denominator and a peak intensity of the (111) plane of $Li_2S$ after the mechanical milling treatment as a numerator. In the same manner, a residual amount of a raw material of LiI and a residual amount of a raw material of LiBr were calculated using peak intensities of the (111) plane of LiI and LiBr after the mechanical milling treatment as a numerator, respectively. The results are shown in FIG. 3.

Figure 3:
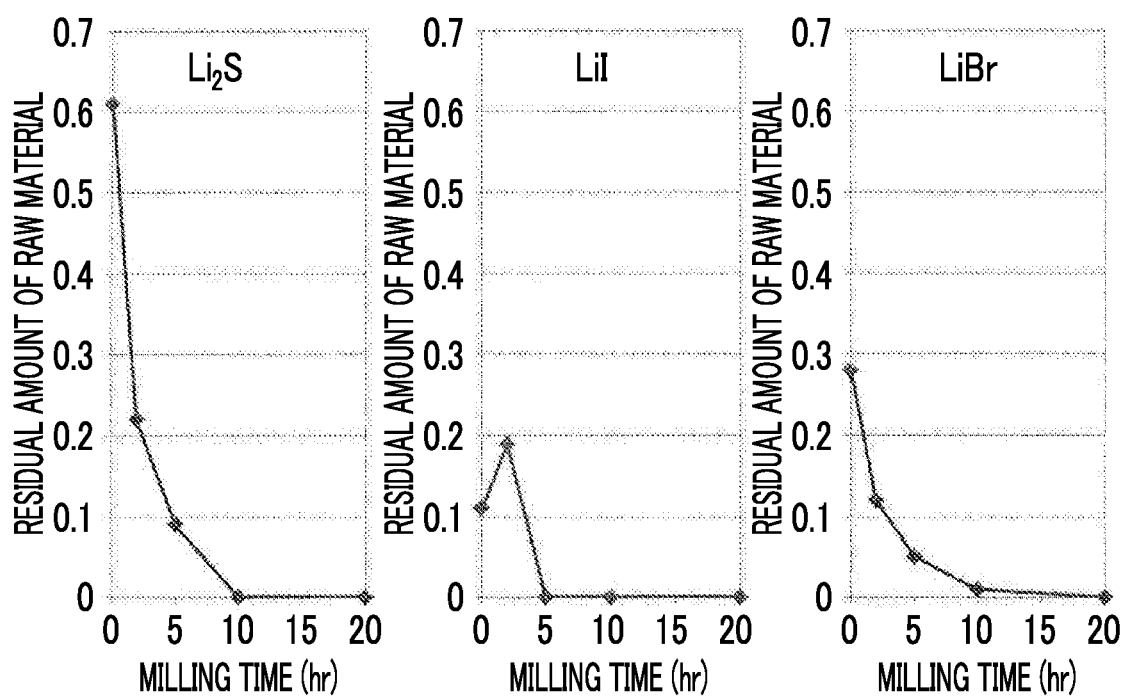
FIG. 3 is a graph showing changes in residual amounts of raw materials over time during milling in Comparative Example 1.

As shown in FIG. 3, in Comparative Example 1, the LiI residual amount became zero within 5 hours and the $Li_2S$ residual amount became zero within 10 hours. On the other hand, the LiBr residual amount did not became zero within 10 hours but it became zero within 20 hours. Thus, LiBr had much lower reactivity than $Li_2S$. In addition, LiBr and LiI were both a lithium halide, and LiBr had lower reactivity than LiI. The reason for this is inferred to be as follows. A bromide ion has a smaller ionic radius than an iodine ion and was strongly bonded to the Li ion.

Comparative Example 2

$Li_2S$, LiI, and LiBr were weighed out at a molar ratio of $Li_2S$:LiI:LiBr=6:1:1 in a glove box under an argon atmosphere. These raw materials were dissolved in methanol (boiling point of about 65° C.) which was a good solvent so that the concentration became 50 g/L in total. The obtained solution was put into a flask, a mixed gas of $H_2S$ (200 mL/min) and Ar (100 mL/min) was blown into a bubbling tube, and $Li_2S$ was changed to LiHS ($Li_2S+H_2S \rightarrow 2LiHS$). Thus, a raw material solution in which LiHS, LiI, and LiBr were dissolved in methanol was obtained.

Next, as shown in FIG. 2, 350 mL of tridecane (boiling point of about 235° C.) as a poor solvent was added to a 3-neck flask, and the 3-neck flask was placed in an oil bath heated at 230° C. In addition, Ar gas was circulated in the 3-neck flask. After the temperature of the poor solvent had stabilized, the raw material solution was sprayed into the poor solvent at about 50 mL/min over 5 minutes through a nozzle. Then, spraying was stopped, precipitates precipitated in the poor solvent were filtered off and collected, and composite particles were obtained.

The obtained composite particles and $P_2S_5$ were weighed out at a molar ratio of composite particles ($6Li_2S \cdot LiI \cdot LiBr$):$P_2S_5$=1:2 and mixed. The composition of the obtained mixture was $10LiI \cdot 10LiBr \cdot 80 (0.75Li_2S \cdot 0.25P_2S_5)$. The obtained mixture was subjected to a mechanical milling treatment according to planetary ball milling and a sulfide solid electrolyte material was obtained. Milling conditions were the same as in Comparative Example 1.

[Evaluation]

(SEM Observation)

Figure 4A:
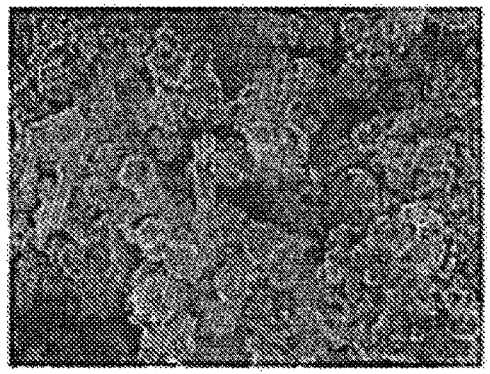
FIG. 4A is an SEM image of composite particles prepared in Comparative Example 2.
Figure 4B:
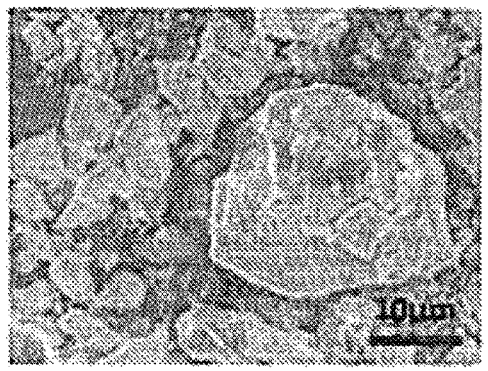
FIG. 4B is an SEM image of a raw material ($Li_2S$) used in Comparative Examples 1 and 2.
Figure 4D:
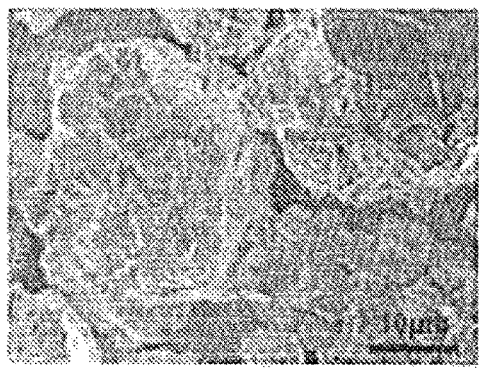
FIG. 4D is an SEM image of a raw material (LiBr) used in Comparative Examples 1 and 2.
Figure 4C:
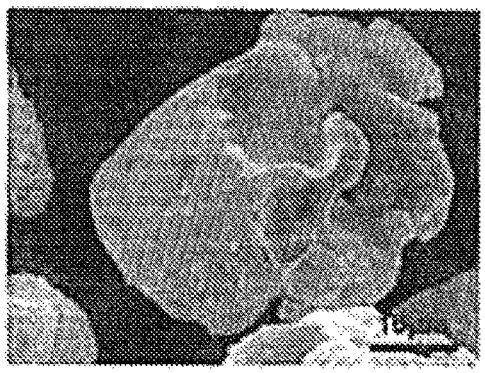
FIG. 4C is an SEM image of a raw material (LiI) used in Comparative Examples 1 and 2.
Figure 4E:
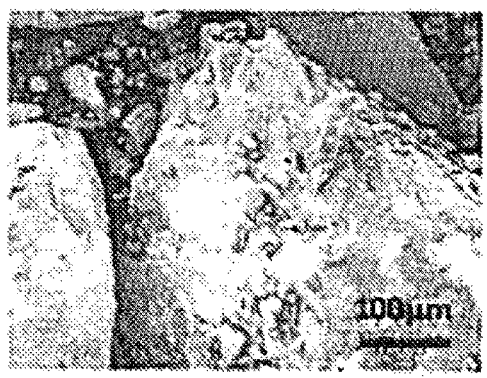
FIG. 4E is an SEM image of a raw material ($P_2S_5$) used in Comparative Examples 1 and 2.

The composite particles prepared in Comparative Example 2 were observed under a scanning electron microscope (SEM). The results are shown in FIG. 4A. As shown in FIG. 4A, composite particles having a small particle size were obtained, and the average primary particle size thereof was 5 μm or less. Here, FIGS. 4B to 4D show $Li_2S$, LiI, and LiBr used as raw materials in Comparative Examples 1 and 2. FIG. 4E shows $P_2S_5$. All of these materials had a large particle size.

(XRD Measurement)

Figure 5:
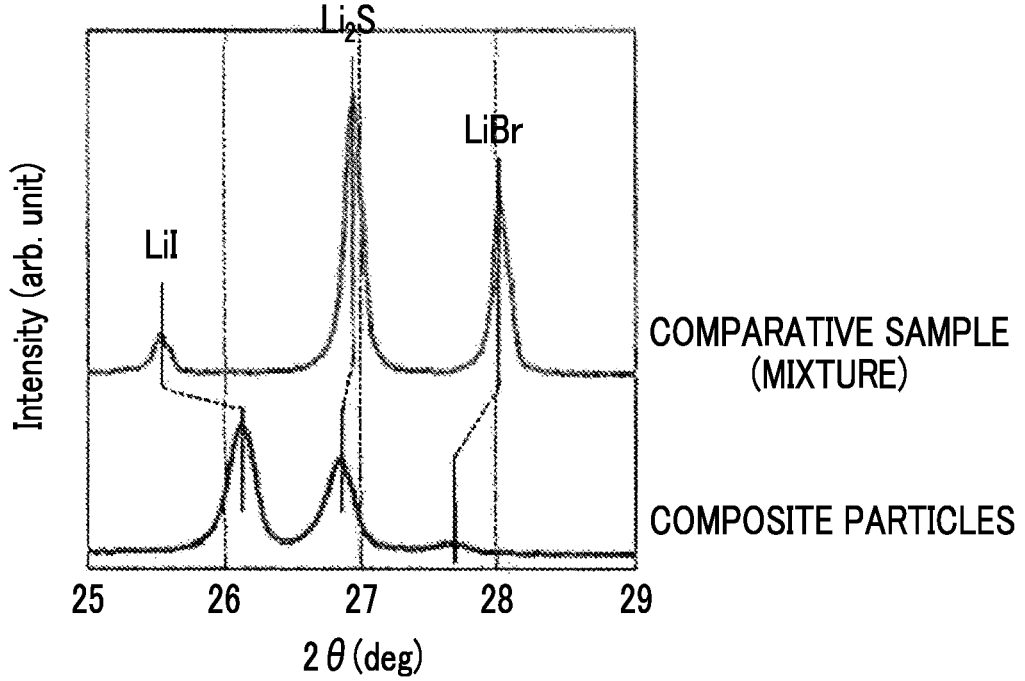
FIG. 5 shows results of XRD measurement of composite particles prepared in Comparative Example 2.

The composite particles prepared in Comparative Example 2 were measured through X-ray diffraction (XRD) using CuKα rays. In addition, a mixture of $Li_2S$ powder, LiI powder, and LiBr powder was prepared as a comparative sample, and XRD measurement was performed in the same manner. The results are shown in FIG. 5. As shown in FIG. 5, in the comparative sample, the peak of the (111) plane of LiI appeared at a position of $2\theta=25.52°$. On the other hand, in the composite particles, the peak position was shifted to a higher angle side, and the peak appeared at a position of $2\theta=26.12°$. The reason for this is inferred to be as follows. At least one of a $Li_2S$ component and a LiBr component was solid-solutionized in the LiI component. That is, a LiI rich phase was inferred to be formed.

In addition, in the comparative sample, the peak of the (111) plane of $Li_2S$ appeared at a position of $2\theta=26.94°$. On the other hand, in the composite particles, the peak position was shifted to a lower angle side and the peak appeared at a position of $2\theta=26.86°$. The reason for this is inferred to be as follows. At least one of a LiI component and a LiBr component was solid-solutionized in the $Li_2S$ component. That is, the $Li_2S$ rich phase was inferred to be formed. In the same manner, in the comparative sample, the peak of the (111) plane of LiBr appeared at a position of $2\theta=28.02°$. On the other hand, in the composite particles, the peak position was shifted to a lower angle side and the peak appeared at a position of $2\theta=27.68°$. The reason for this is inferred to be as follows. At least one of a $Li_2S$ component and a LiI component was solid-solutionized in the LiBr component. That is, a LiBr rich phase was inferred to be formed. In addition, since the peak of the LiBr rich phase was smaller than the peaks of the $Li_2S$ rich phase and the LiI rich phase, it was suggested that most of the LiBr component was solid-solutionized in the $Li_2S$ rich phase and the LiI rich phase.

(Residual Amount of Raw Materials)

Figure 6:
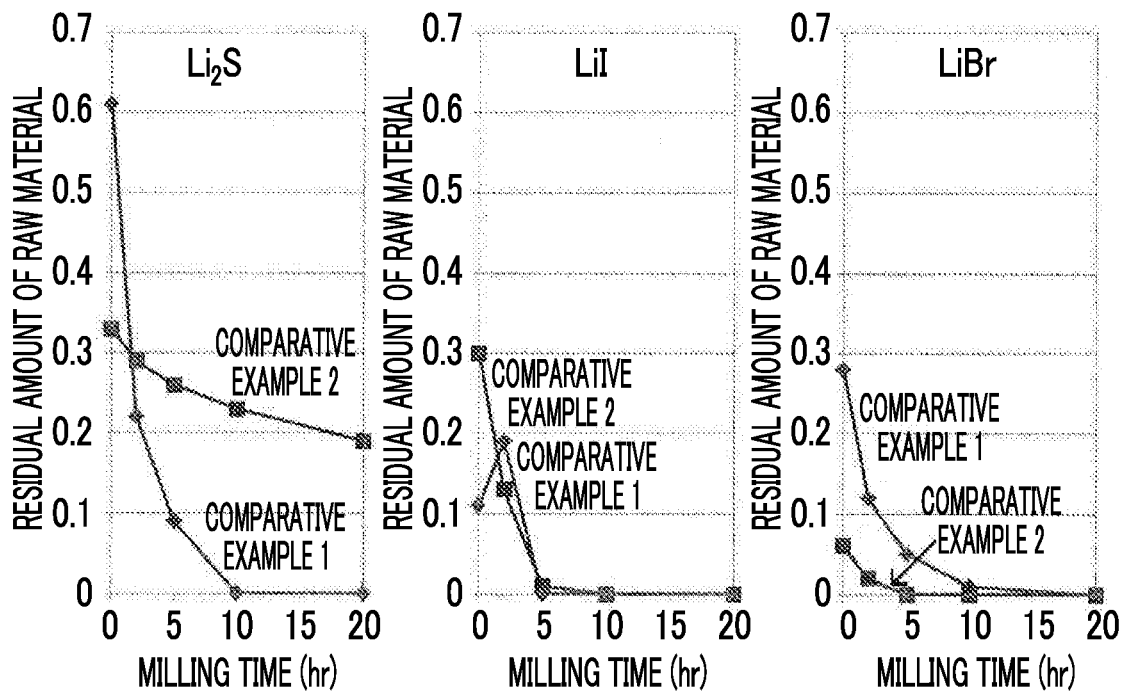
FIG. 6 shows graphs of changes in residual amounts of raw materials over time during milling in Comparative Examples 1 and 2.

Changes in residual amounts of raw materials over time during milling in Comparative Example 2 were evaluated through XRD measurement. A method of calculating a residual amount of a raw material was the same as in Comparative Example 1. However, in Comparative Example 2, the LiI rich phase, the $Li_2S$ rich phase, and the LiBr rich phase were used for peaks used for calculation. The results of Comparative Examples 1 and 2 are shown in FIG. 6. As shown in FIG. 6, in Comparative Example 2, the LiBr residual amount became zero within 5 hours and a treatment time became shorter than in Comparative Example 1. In addition, in Comparative Example 1 and Comparative Example 2, the LiI residual amount became almost zero within 5 hours. On the other hand, in Comparative Example 1, the $Li_2S$ residual amount became zero within 10 hours, and in Comparative Example 2, a large $Li_2S$ residual amount remained even after 20 hours. In this manner, in Comparative Example 2, when composite particles including a solid solution including a LiBr component was prepared, the reactivity of the LiBr component could be improved. However, in opposition to improvement in reactivity of the LiBr component, the reactivity of the $Li_2S$ component decreased. The reason for the decrease in the reactivity of the $Li_2S$ component was inferred to be as follows. The $Li_2S$ component included in the composite particles had a lower activity than $Li_2S$ powder.

Example 1

First, composite particles were obtained in the same manner as in Comparative Example 2. Next, the obtained composite particles and $P_2S_5$ were weighed out at a molar ratio of composite particles $(6Li_2S \cdot LiI \cdot LiBr):P_2S_5=1:2$, and a mixture was obtained. The obtained mixture was subjected to a mechanical milling treatment according to planetary ball milling and a sulfide solid electrolyte material was obtained. Milling conditions were as follows.

<Milling Conditions>

Composition: $10LiI \cdot 10LiBr \cdot 80(0.75Li_2S \cdot 0.25P_2S_5)$

Pot: 45 cc commercially available from Fritsch Co., Ltd.

Loading amount: 2 g

Dispersion medium: dodecane 4 g

Device: planetary ball mill (commercially available from Ito Seisakusho Co., Ltd.)

Rotational speed: 290 rpm

Temperature: set to 130° C. (actually measured temperature of a surface of a pot 121° C.)

Here, the planetary ball mill was accommodated in a case including a heater, and heat generated from the heater was transferred to the pot through the atmosphere in the case. The temperature of the surface of the pot was measured using a temperature sensing label.

Comparative Example 3

First, a mixture was obtained in the same manner as in Comparative Example 1. Next, the obtained mixture was subjected to a mechanical milling treatment according to planetary ball milling and a sulfide solid electrolyte material was obtained. Milling conditions were the same as in Example 1.

Comparative Example 4

A sulfide solid electrolyte material was obtained in the same manner as in Comparative Example 3 except that no heating was performed in the mechanical milling treatment. Here, the actually measured temperature of the surface of the pot was 40° C. or less.

[Evaluation]

Figure 7:
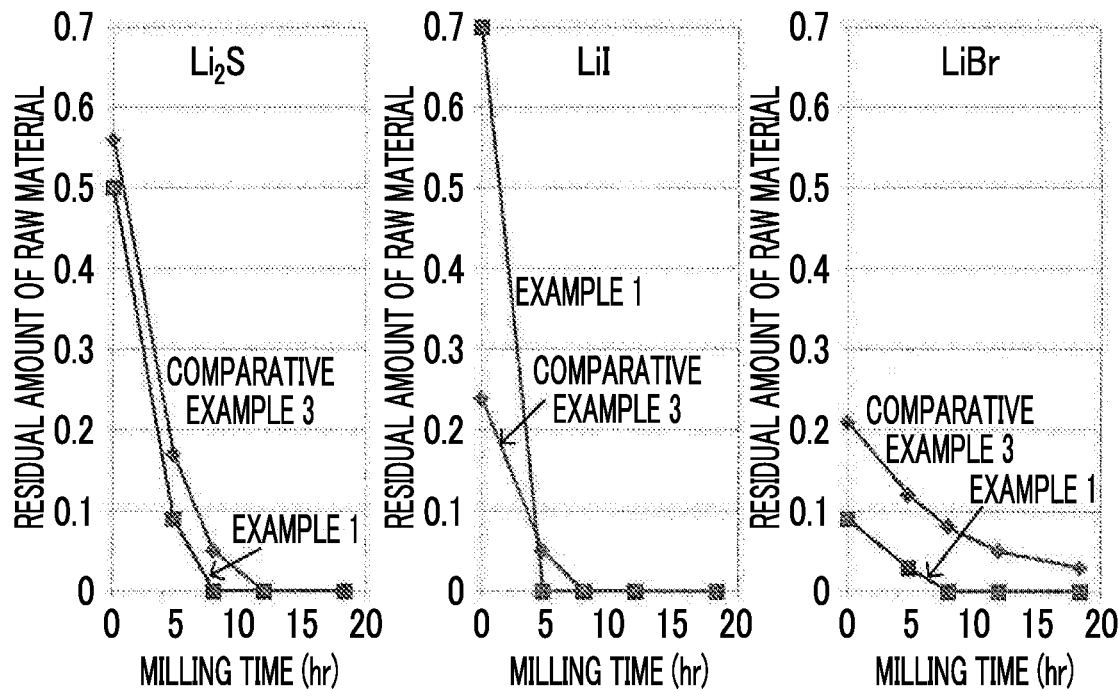
FIG. 7 shows graphs of changes in residual amounts of raw materials over time during milling in Example 1 and Comparative Example 3.

Changes in residual amount of a raw material over time during milling in Example 1 and Comparative Examples 3 and 4 were evaluated through XRD measurement. A method of calculating a residual amount of a raw material was the same as in Comparative Examples 1 and 2. The results of Example 1 and Comparative Example 3 are shown in FIG. 7. As shown in FIG. 7, in Example 1, the $Li_2S$ residual amount, the LiI residual amount, and the LiBr residual amount became zero within 10 hours. On the other hand, in Comparative Example 3, the LiBr residual amount did not become zero within 23 hours. In addition, in Example 1, when the mechanical milling treatment was performed during heating, it was possible to prevent the decrease in the reactivity of the $Li_2S$ component occurring in opposition to improvement in reactivity of the LiBr component. The reason why the decrease in the reactivity of the $Li_2S$ component was prevented was inferred to be as follows. The activity of the $Li_2S$ component included in the composite particles became higher due to heating.

Figure 8:
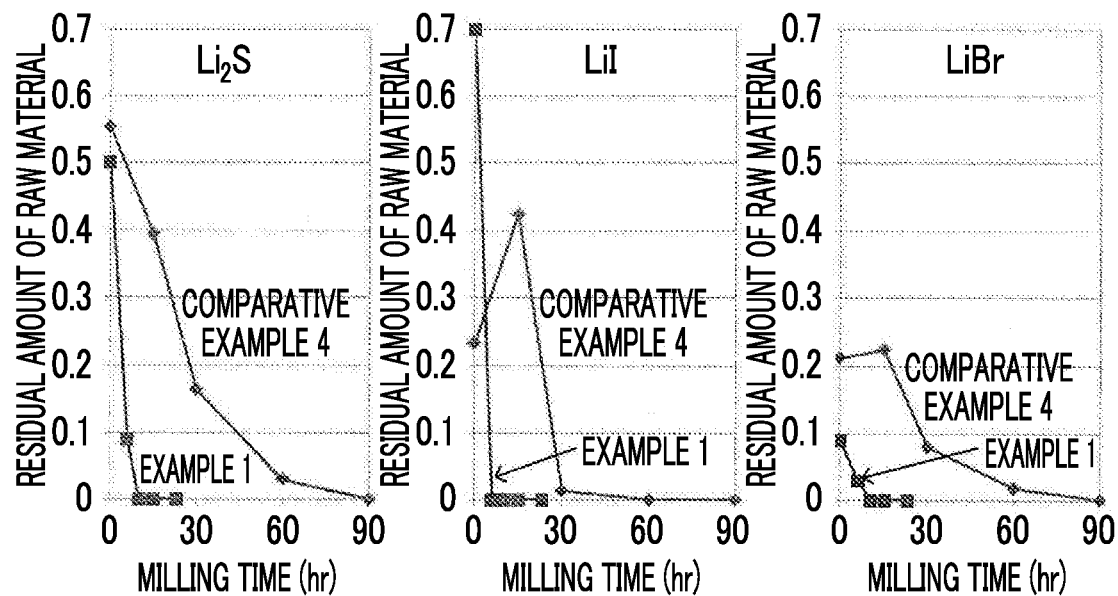
FIG. 8 is a graph of changes in residual amounts of raw materials over time during milling in Example 1 and Comparative Example 4.

In addition, the results of Example 1 and Comparative Example 4 are shown in FIG. 8. As shown in FIG. 8, in Example 1, the $Li_2S$ residual amount, the LiI residual amount, and the LiBr residual amount became zero within 10 hours. On the other hand, in Comparative Example 4, the LiBr residual amount became zero within 90 hours. In addition, in Example 1, the milling time was significantly reduced in all of the $Li_2S$ residual amount, the LiI residual amount, and the LiBr residual amount compared to Comparative Example 4. In addition, when comparing Comparative Example 3 in FIG. 7 and Comparative Example 4 in FIG. 8, the treatment time was reduced due to heating. However, the treatment time was further reduced in Example 1 than in Comparative Example 3. The reason for this is inferred to be the effect of the composite particles. In addition, a problem specific to the composite particles (the decrease in the reactivity of the $Li_2S$ component occurring in opposition to improvement in reactivity of the LiBr component) was solved according to heating at the same time.

What is claimed is:

1. A method of producing a sulfide solid electrolyte material, comprising:
   a preparing process of preparing composite particles including a solid solution including a LiI component, a $Li_2S$ component and a LiBr component, wherein
   the LiI component, the $Li_2S$ component and the LiBr component are solid-solutionized such that the solid solution comprises a LiBr rich phase in which the LiBr component is a main component of the LiBr rich phase, and in an XRD measurement using CuKα rays, a peak position of the (111) plane of the LiBr rich phase is shifted 0.1° or more to a lower angle side of a peak position of the (111) plane of LiBr;
   an addition process of adding the composite particles and a phosphorus source to a reaction chamber; and
   a milling process in which a mechanical milling treatment is performed on the composite particles and the phosphorus source in the reaction chamber while thermal energy is applied.

2. The method of producing a sulfide solid electrolyte material according to claim 1, wherein the solid solution further comprises a $Li_2S$ rich phase in which the $Li_2S$ component is a main component.

3. The method of producing a sulfide solid electrolyte material according to claim 2, wherein, in XRD measurement using CuKα rays, a peak position of the (111) plane of the $Li_2S$ rich phase is shifted to a lower angle side of a peak position of the (111) plane of $Li_2S$.

4. The method of producing a sulfide solid electrolyte material according to claim 1, wherein the peak position of the (111) plane of the LiBr rich phase is shifted 0.3° or more to a lower angle side of a peak position of the (111) plane of LiBr.

5. The method of producing a sulfide solid electrolyte material according to claim 1, wherein the solid solution further comprises a LiI rich phase in which the LiI component is a main component.

6. The method of producing a sulfide solid electrolyte material according to claim 5, wherein, in XRD measurement using CuKα rays, a peak position of the (111) plane of the LiI rich phase is shifted to a higher angle side of a peak position of the (111) plane of LiI.

7. The method of producing a sulfide solid electrolyte material according to claim 1, wherein, in the preparing process, the composite particles are synthesized using a raw material solution including raw materials of the composite particles.

8. The method of producing a sulfide solid electrolyte material according to claim 1, wherein, in the preparing process, a raw material solution including raw materials of the composite particles and a first solvent is brought into contact with a second solvent heated to a temperature higher than a boiling point of the first solvent so that the composite particles are precipitated while the first solvent is evaporated, wherein
   the first solvent is a solvent having a solubility in raw materials of composite particles that is higher than that of the second solvent, and
   the second solvent is a solvent having a solubility in composite particles that is lower than that of the first solvent.

9. The method of producing a sulfide solid electrolyte material according to claim 8, wherein the raw materials of the composite particles include LiHS and LiBr.

10. The method of producing a sulfide solid electrolyte material according to claim 8, wherein the raw materials of the composite particles include $Li_2S$ and LiBr.

11. The method of producing a sulfide solid electrolyte material according to claim 1, wherein, in the preparing process, a raw material solution including raw materials of the composite particles and a first solvent is brought into contact with a solid heated to a temperature higher than a boiling point of the first solvent so that the composite particles are precipitated while the first solvent is evaporated.

12. The method of producing a sulfide solid electrolyte material according to claim 11, wherein the raw materials of the composite particles include LiHS and LiBr.

13. The method of producing a sulfide solid electrolyte material according to claim 11, wherein the raw materials of the composite particles include $Li_2S$ and LiBr.

14. The method of producing a sulfide solid electrolyte material according to claim 7, wherein the raw materials of the composite particles further include LiI.

15. The method of producing a sulfide solid electrolyte material according to claim 1,
   wherein the preparing process includes
      a drying treatment in which a raw material solution including LiI, LiOH, LiBr, and water is dried to remove moisture such that a raw material mixture including LiI, LiOH and LiBr is obtained;
      a sulfurization treatment in which LiOH in the raw material mixture is sulfurized such that LiHS is obtained; and
      a hydrodesulfurization treatment in which hydrogen sulfide is desorbed from LiHS such that $Li_2S$ is obtained.

16. The method of producing a sulfide solid electrolyte material according to claim 1, wherein the phosphorus source is $P_2S_5$.

17. The method of producing a sulfide solid electrolyte material according to claim 1, wherein a heating temperature in the milling process is in a range of 70° C. to 150° C.

* * * * *